United States Patent Office 3,725,204
Patented Apr. 3, 1973

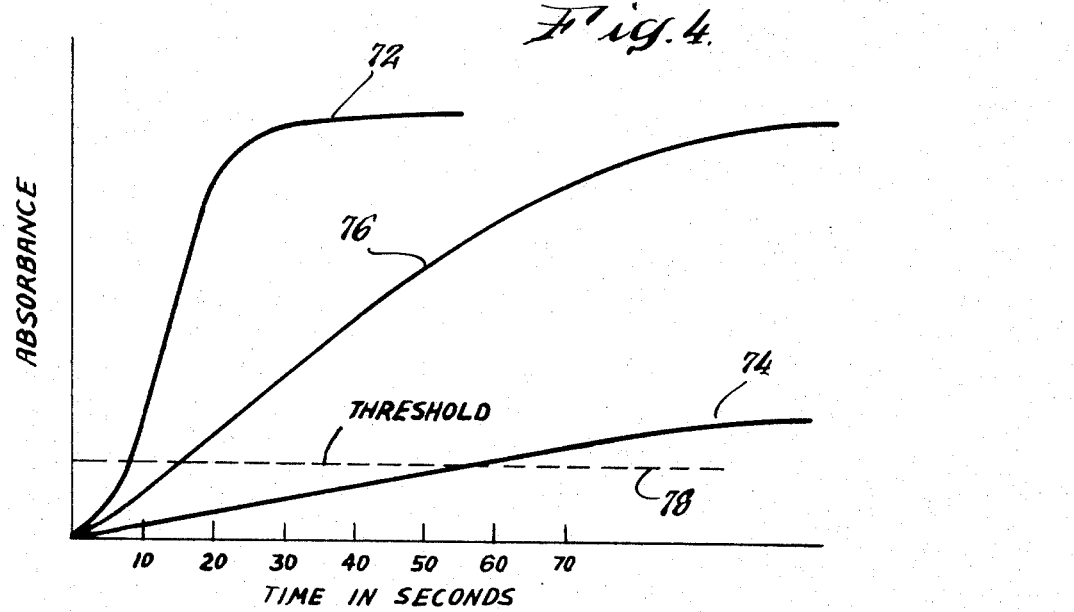
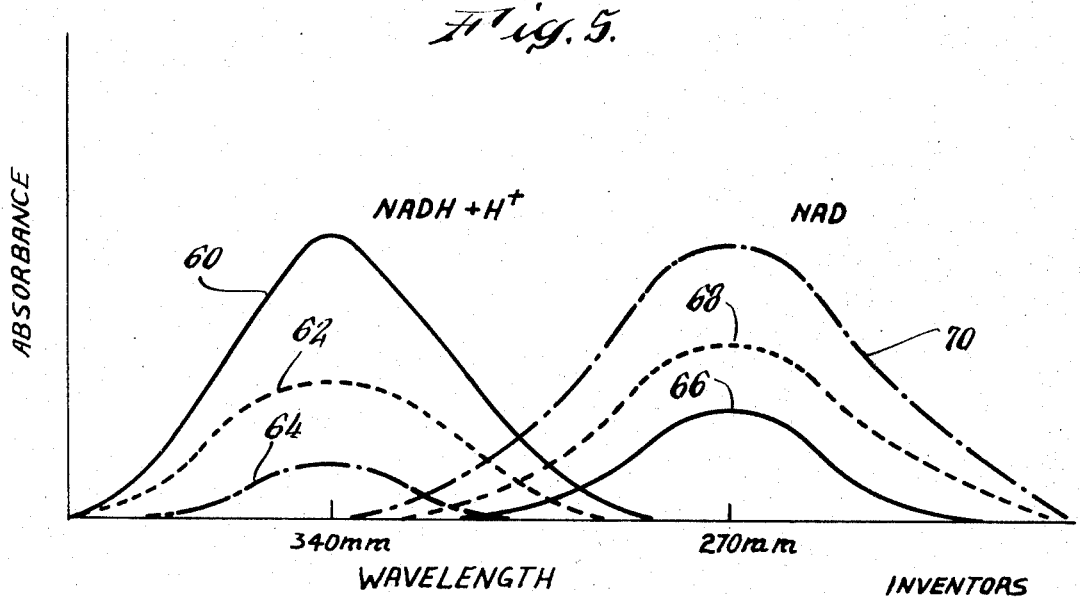

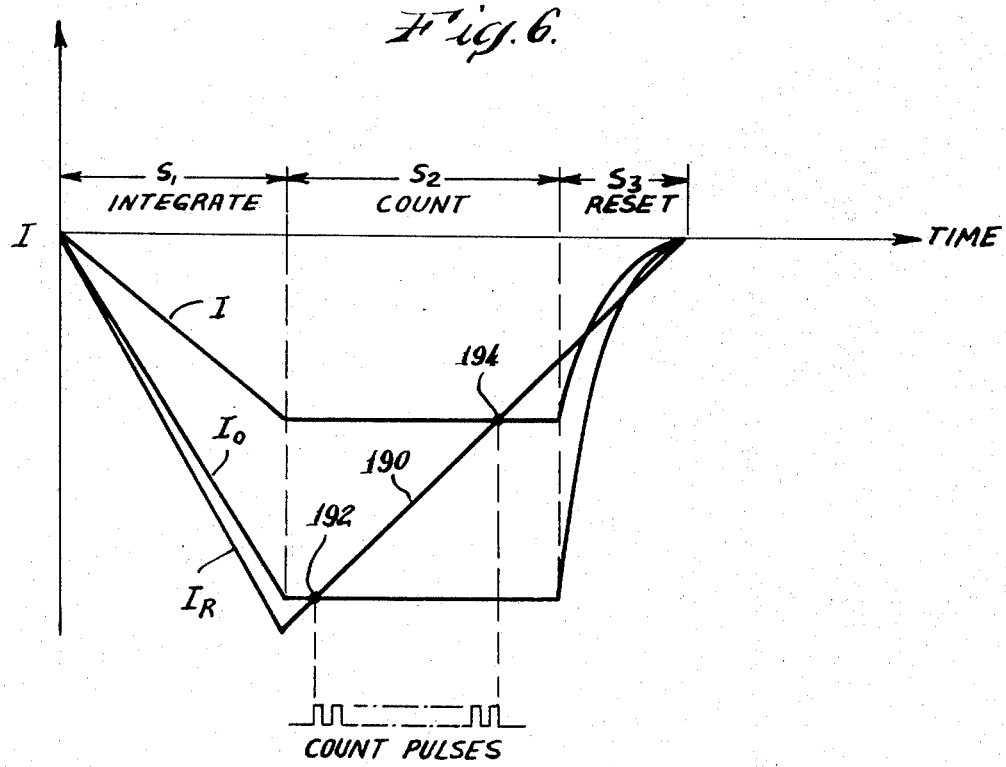
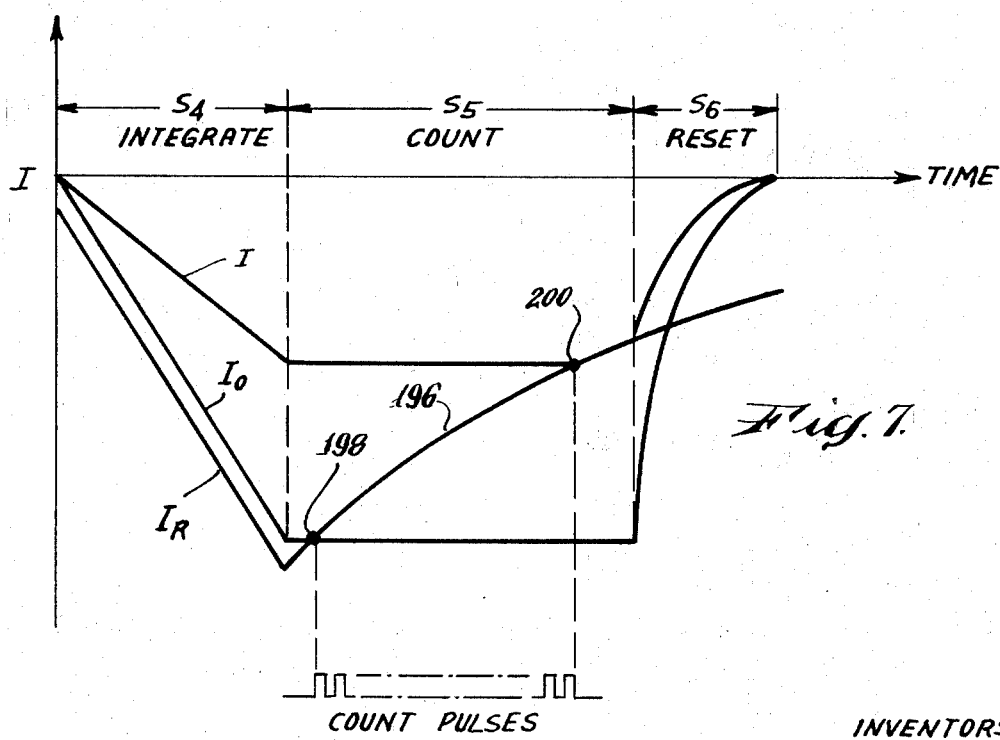

3,725,204
REACTION DETECTOR
Hamilton W. Marshall, Jr., Norwalk, and John R. Smeaton, Ridgefield, Conn., assignors to The Perkin-Elmer Corporation, Norwalk, Conn.
Filed Aug. 2, 1971, Ser. No. 167,947
Int. Cl. C12k 1/00
U.S. Cl. 195—127      7 Claims

ABSTRACT OF THE DISCLOSURE

A reaction detector measures the rate of reaction in a substance undergoing a reaction, such as an enzyme-catalyzed chemical reaction, by measuring the rate of change of absorbance in the substance during the reaction. This is accomplished by comparing the intensities of light penetrating through a reference and through the sample substance undergoing the reaction. The difference between the two intensities is measured and this difference is utilized to make the amplitude of a signal derived from the reference substantially equal to the amplitude of the signal derived from the sample substance. The reference signal is kept constant to establish a reference level whereas the sample signal is measured a predetermined time later and such a measurement provides directly the reaction rate. This reaction rate is then automatically transformed into units specifying the concentration of enzymes in the sample substance.

BACKGROUND OF THE INVENTION

Many biological, physiological, or chemical phenomena are analyzed by passing light through solutions, suspensions, or other liquid samples and comparing the transmittance of the light therethrough with the light transmitted through a reference material. The light is of a single wavelength but is made variable so that the investigations may progress over a range of wavelengths for different conditions. The concentration of any substance in the sample is measured, in cases where the concentration is proportional to optical density, by detecting the absorbance of light passing through the sample. Many kinds of phenomena, such as enzyme-catalyzed reactions, can be studied by measuring such absorbance.

The field of clinical chemical analysis is achieving significant advances due to the application of enzyme chemistry to the quantitative analysis of serum and other substances that are of clinical or pathological interest. Enzymes are proteins that function as organic catalysts. Such catalysts are capable of inducing chemical changes in other substances without themselves being changed in the process. Enzymes may, for example, be found in the digestive juices acting upon food substances causing them to break down into simpler compounds. Such reactions are decompositions of a hydrolytic nature. However, enzymes are equally important in the synthetic reactions of assimilation.

The principal difference in enzyme chemistry from previous clinical methods is that frequently in enzyme-catalyzed reactions it is the rate of reaction that provides the useful data. Heretofore reaction rates were measured by recording the absorbance of a substance at two different times during the reaction and then mathematically calculating the rate of reaction from the recording, such as is described in Patents 3,344,702 and 3,523,737. Another technique, as described in Patent 3,542,515, consisted of starting an identical reaction in two different cells at two different predetermined times and measuring simultaneously the absorbance in the two cells during the reaction. The two measurements are subtracted from each other to determine the absorbance change during the predetermined time. Such techniques do not provide a direct automatic reading of the reaction rate.

SUMMARY OF THE INVENTION

A reaction detector embodying the invention measures directly the rate of change in absorbance in a sample substance undergoing a reaction by referencing the absorbance of light in the sample substance to a zero referencing the absorbance of light in the sample substance to a zero reference level and then making a second measurement of the absorbance in the sample at a predetermined time later. The zero reference level is derived from a reference signal.

The reaction detector is transformed into an enzyme concentration detector by automatically converting the measured reaction rate into units signifying he concentration of enzymes in the sample substance.

BRIEF DESCRIPTION OF THE DRAWINGS

FIG. 4 is a graph illustrating the different rates of reaction exhibited by different concentrations of enzymes in a sample;

FIG. 5 is a graphical illustration of the change in color that occurs in an enzyme-catalyzed chemical reaction; and FIGS. 6 and 7 are graphical illustrations of how the circuit of FIG. 3 performs during referencing and measuring modes of operation respectively.

GENERAL DESCRIPTION

Figure 1:
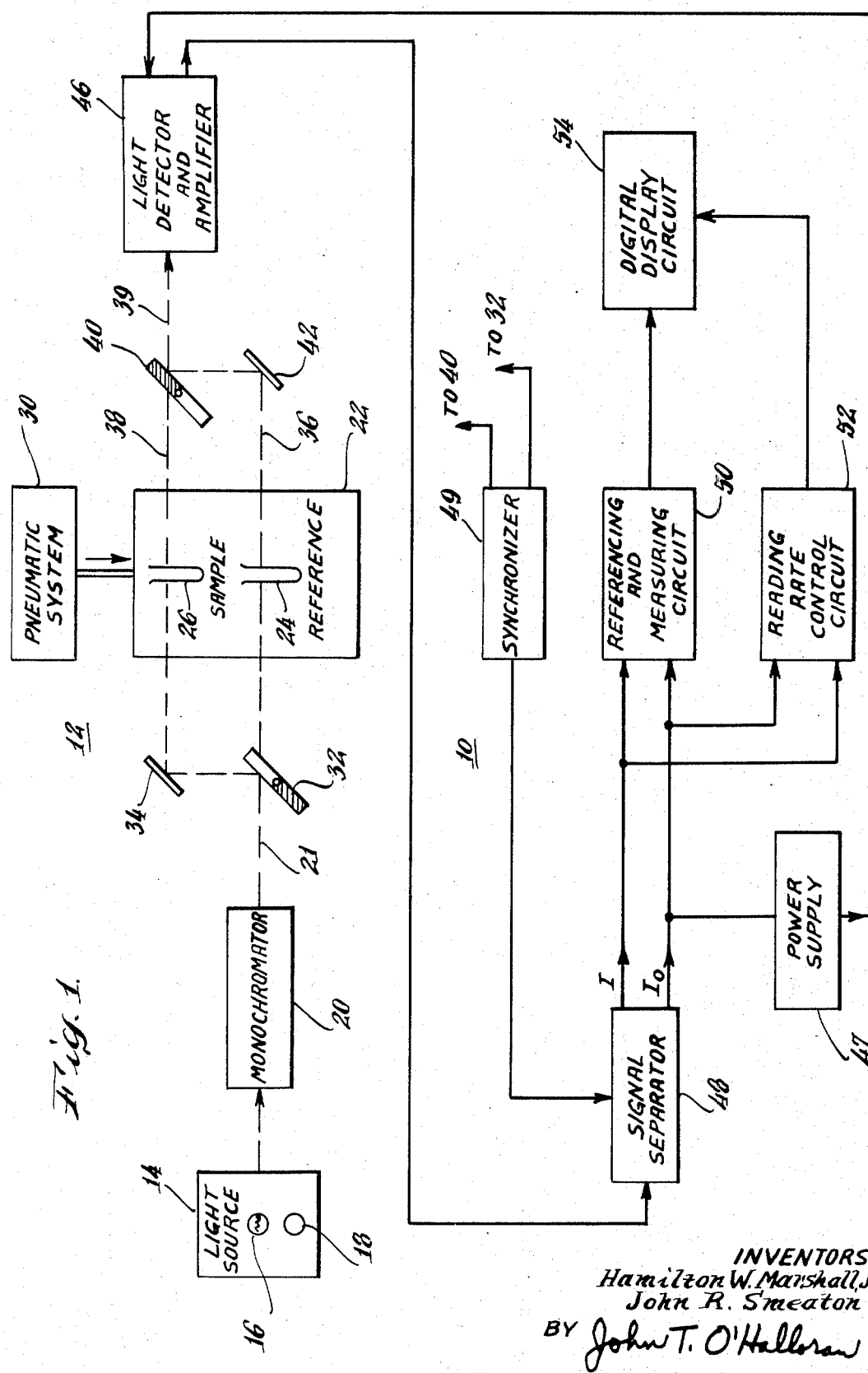
FIG. 1 is an overall block diagram of a reaction detector embodying the invention.

In FIG. 1 there is shown an overall schematic block diagram of a rate of reaction detector embodying the invention. The detector 10 is capable of measuring any rate of reaction in a substance but for convenience will be described as one for measuring rates of reactions in enzyme-catalyzed reactions. The reactions measured are zero order kinetic reactions, which are defined as reactions wherein the rate of change of absorbance exhibits a substantially constant (i.e., linear) slope. The detector 10 automatically converts a zero order kinetic reaction into a digital readout without further operator intervention.

The detector 10 includes a spectrophotometric portion 12 for projecting light of a predetermined intensity and frequency through a reference material and a sample substance to detect the difference in absorbance between the two. The spectrophotometer 12 includes a light source 14 having a tungsten incandescent lamp 16 for providing light throughout a wavelength range of 300–800 nanometers (nm.) and a deuterium arc lamp 18 for providing light throughout a wavelength range of approximately 190–360 nm. The light from the light source 14 is focused onto a monochromator 20 that extracts a light beam 21 of a single frequency for providing the reference and sample light beams.

The reference material and sample substance are incorporated in a sample compartment 22. The reference material in the reference cell 24 in the compartment 22 is maintained fixed, whereas the sample substance in the sample cell 26 is replaced periodically. A pneumatic system 30, to be described in more detail subsequently, accomplishes such periodic replacement.

The light beam 21 is projected onto a rotating mirror 32 and penetrates through the transparent half of the mirror 32 on alternate half-cycle rotations of the mirror 32. This beam 36 comprises the reference light beam. On the other half-cycle rotations of the mirror 32 the light beam 21 is reflected by the mirror 32 to a mirror 34 and projected through the sample cell 26. This sample light beam 38 and the reference light beam 36 are combined then into one resultant beam 39. This is accomplished by projectig the sample beam 38 directly onto a rotating mirror 40 and reflecting the reference beam 36 by a mirror 42 onto the rotating mirror 40. The mirror 40 may be a fixed, slotted mirror rather than a rotating mirror. The combined output signal 39 includes alternate half-cycles of reference and sample beams and is projected onto a light detector and amplifier 46.

The light detector 46 functions as a transducer of light energy into electrical energy. The detector 46 may for example include a photomultiplier that transduces the light beam 39 into a varying electronic signal that is amplified in the amplifier portion thereof. The amplified signal is applied to a signal separator circuit or chopper 48 wherein the reference ($I_o$) and sample (I) electrical signals are separated from each other. A timing and synchronization circuit 49 is included in the spectrophotometric unit 12 to insure that mirrors 32 and 40 rotate in synchronism and that the signal separation in the chopper 48 is accurately synchronized with such rotation. The reference signal $I_o$ is coupled to a power supply 47 for the photomultiplier in the detector 46 to provide an automatic feedback to maintain the amplitude of the reference signal $I_o$ subsantially constant.

The reference and sample electrical signals are applied to the electronic readout portion of the detector 10. A referencing and measuring circuit 50 is provided both to automatically reference the sample signal I to a reference zero level and then to read the change in absorbance in the sample signal a predetermined time later. The predetermined reading time is determined by applying the reference $I_o$ and sample I signals to a reading rate control circuit 52 that determines the rate at which readings will be taken during the reaction. Fast reactions are read at shorter time intervals than slower reactions. The control circuit 52 and the referencing and measuring circuit 50 are coupled to a digital display circuit 54. The digital display circuit 54 converts the measurements of the referencing and measuring circuit 50 into a digital display of the enzyme concentration in the sample.

In the operation of the detector 10 of FIG. 1, a sample substance that is undergoing an enzyme-catalyzed reaction is introduced by the pneumatic system 30 into the sample cell 26 and light that is monochromatic in nature is transmitted through both the sample and reference cells along optical paths that are equal in length. The light is transduced into electrical energy by the light detector and amplifier 46, and the electronic signal is separated or chopped by the signal separator 48 to provide separate sample and reference signals. During the reaction, the sample substance is changing absorbance because of the chemical reaction being undergone, whereas the reference signal is maintained substantially constant because of the absence of a reaction in the reference cell and the feedback control of the signal level of the photomultiplier in the light detector 46.

The reaction may for example be selected to measure the concentration of the enzyme lactate dehydrogenase (LDH) in a blood sample. Such an enzyme is typically found in serum in relatively small amounts and is a component of red blood cells. When an organic disease such as a heart attack occurs, this enzyme is released and its concentration rises significantly in serum. Serum extracted from a patient's blood sample is treated with appropriate reagents and introduced into the spectrophotometer sample cell 26. The reagents selected to form the substrate for the enzyme-catalyzed reaction may be selected from the manual entitled "The Enzyme Application of The Perkin-Elmer Model 602" and published in 1971 by The Perkin-Elmer Corporation of Main Avenue, Norwalk, Conn. The reagents are specified to provide a zero order kinetic reaction wherein the absorbance change in the sample exhibits a substantially constant rate of change.

A selected chemical reaction may for example be in accordance with the following chemical equation:

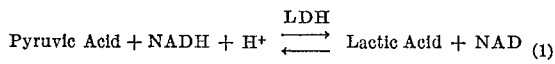

$$\text{Pyruvic Acid} + \text{NADH} + \text{H}^+ \underset{\longleftarrow}{\overset{\text{LDH}}{\longrightarrow}} \text{Lactic Acid} + \text{NAD} \quad (1)$$

In this reaction, nicotinamide adenine dinucleotide ($\text{NADH}+\text{H}^+$) is changed to its oxidized form NAD. The rate at which such a change occurs is determined by the concentration of LDH enzymes in the sample and hence the rate of change is a measure of the number of enzymes in the sample. During this reaction there is a color change in the reduction of $\text{NADH}+\text{H}^+$ to its oxidized form, NAD. Such a color change is illustrated in FIG. 5.

The curve 60 represents the absorbance of $\text{NADH}+\text{H}^+$ at the beginning of the reaction. It is to be noted that the curve 60 peaks at 340 nanometers and is substantially zero at 270 nm. As the reaction occurs the absorbance exhibited by $\text{NADH}+\text{H}^+$ decreases from the curve 60 to the curves 62, 64 and finally zero as $\text{NADH}+\text{H}^+$ is changed. The decrease of $\text{NADH}+\text{H}^+$ and the speed at which it occurs is directly proportional to the concentration of the enzyme LDH in the serum. The oxidized version NAD increases in absorbance as it is formed, as shown by the curves 66, 68 and 70 in FIG. 5. The peak of absorbance of the oxidized version NAD occurs at 270 nm. Consequently during the reaction, the monochromator 20 is adjusted to operate at 340 nm.

The reading rate control circuit 52 detects the rate at which the reaction is going. The purpose of initially detecting the rate of reaction is because in an untested serum sample, it is not ascertainable by sight just how heavy is the concentration of enzymes. If the concentration of enzymes is great, then the rate of reaction is very fast. If the concentration is lower, the reaction is slower. If readings are taken at too slow a rate, the reaction will be over before meaningful data is acquired.

As shown in FIG. 4, the reaction that would occur in the above-identified chemical reaction where the enzyme concentration is high, would be similar to that illustrated by the curve 72. It is to be noted that the absorbance changes with time very rapidly. Where the concentration of enzymes is very low, the rate of reaction is very slow, as illustrated by the curve 74. With an intermediate concentration of enzymes, a rate shown by the curve 76 would occur. It is to be noted that all of these reaction curves, 72, 74 and 76 are zero(0) order kinetic reactions in that they exhibit substantially constant slopes in their midportions and meaningful reading may be taken by the detector 10 in this portion.

By automatically measuring the initial speed of the reaction, the control circuit 52 ascertains how fast the reaction is going and switches the reading mode of operation of the detector 10 from a thirty-second read period to a ten-second read period if the reaction is fast so that meaningful data can be obtained from the input signals. Thus a threshold level 78, shown in FIG. 4, may for example be set at an absorbance level of 0.5 absorbance. If such an absorbance is exhibited prior to the first ten-second interval then the control circuit 52 switches to the ten-second reading mode rate. Consequently valid readings can be achieved for a very fast reaction such as that shown by the curve 72. When the initial absorbance change does not exceed the threshold 78 within ten seconds of the beginning of the test, then a thirty-second reading rate is maintained and meaningful readings are obtainable from a curve such as 74. Of course any other and additional time intervals may be selected in the reading mode.

The referencing and measuring circuit 50 measures the absorbance rate of change of the sample substance. The equation for absorbance is:

$$\text{Absorbance} = \log_{10} \frac{I_o}{I} = 0 \quad (2)$$

To measure directly the rate of change in absorbance, the referencing and measuring circuit 50 first makes the reference signal $I_o$ equal to the sample signal I. In such a situation the Equation 2 reduces to:

$$\text{Absorbance} = \log_1{}^0 \frac{I_o}{I} = 0 \quad (3)$$

This is known as automatically zeroing (A/Z) the sample signal I. This is accomplished in the circuit 50 by measuring the difference between the signals $I_o$ and I and subtracting the difference from the larger signal to reduce it to the smaller signal. For example, the reference signal $I_o$ may exhibit a larger absolute magnitude than the sample signal I. Accordingly in the circuit 50 this difference is detected and subtracted from the reference signal $I_o$ to reduce it to the same magnitude as the sample signal. The reference signal $I_o$ is then maintained constant until a reading is made.

The effect of this operation is to provide a zero reference level for the sample signal I. The sample signal I amplitude changes as the reaction continues but the reference signal $I_o$ is maintained constant. Thus at a predetermined time later a second reading of the signals directly provides the rate of absorbance change in the sample signal I.

If the detector 10 is operated in the repeat mode, the sample and reference signals are autozeroed again to provide a new zero reference level and the sample signal I is read again at the predetermined time later. As long as the reaction is a zero order kinetic reaction and the second reading occurred before the substrate was consumed, i.e., prior to the flattening out of the curves 72 and 76 in FIG. 4, the second reading will substantially equal the first and be a check therefor. If the detector 10 is operated in the single mode, only a single reading is made and the detector 10 is ready to analyze a new sample.

After a reading has taken place, the absorbance rate of change is applied to the digital display circuit 54 wherein the readings are automatically converted to units that define the concentration of enzymes in the sample substance. The units are displayed digitally on Nixie tubes or printed out on a printer (not shown). The units are international units standardized to express concentration of enzymes in units of one micromole of substrate consumed per minute at defined conditions of temperature, etc. Thus effectively the detector 10 reads the slope of the curves 72, 74 and 76 directly and these slopes are converted into international units in the digital display circuit 54.

DETAILED DESCRIPTION

Figure 2:
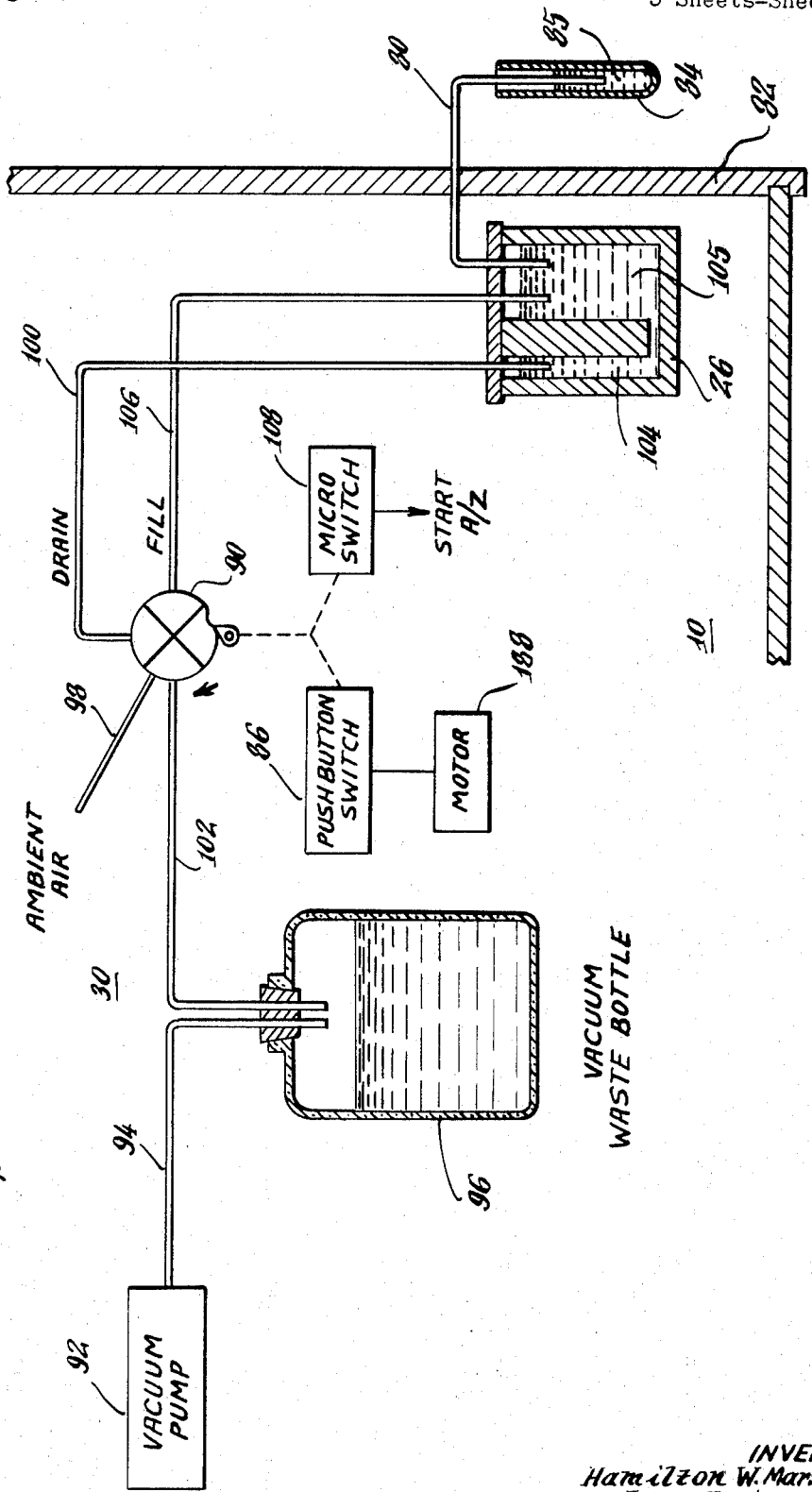
FIG. 2 is a partially schematic and partially pictorial view of the pneumatic portion of the reaction detector shown in FIG. 1.

A more detailed description of the pneumatic system 30 and the electronic readout portion of the detector 10 is now given. Referring to FIG. 2, there is shown a schematic of the pneumatic system 30 of the detector 10. An inlet tube 80 penetrates through the front cover 82 of the detector 10 and the tube 80 is exposed to ambient air. A serum sample, which may contain the enzyme LDH, and which may, for example, be 0.2 milliliter in volume, and a substrate of pyruvic acid and NADH+H+, which may for example be 2 milliliters in volume, are inserted into a cuvette 84. The cuvette 84 is then positioned by an operator such that the inlet tube 80 penetrates into the sample substance 85 in the cuvette 84. A ball and socket arrangement (not shown) holds the cuvette 84 attached to the front panel 82 of the detector 10. The operator then pushes a push-button 86 accessible to him, which turns on a motor 88 and causes a master valve 90 to rotate to initiate the introduction of the sample substance 85 into the sample cell 26. A vacuum pump 92, which is operating continuously, is coupled through a vacuum line 94 to a vacuum waste bottle 96. At the beginning of the cycle that is controlled by the master valve 90, ambient air is drawn through an ambient air line 98 into the pneumatic system 30. As the master valve 90 is rotated the ambient air line 98 is disconnected from the vacuum pump 92 and a drain line 100 is connected thereto. Such a connection is through the valve 90, through the line 102, the vacuum bottle 96, the vacuum line 94, and to the vacuum pump 92. The drain line 100 penetrates into the drain cavity 104 of the cell 26. The vacuum pump 92 therefore sucks out the old sample and sucks in a portion of the new sample substance 85. The previous sample is therefore not only sucked into the waste bottle, but a portion of the new sample 85 is also. Thus the sample cell 26 is effectively drained of the old sample and then washed by the new sample 85. The continued rotation of the master valve 90 by the motor 88 disconnects the drain line 100 from the vacuum pump 92 and connects the fill line 106 thereto. The other end of the fill line 106 projects into the cavity 105 of the sample cell 26. Consequently the fill line 106 sucks the remaining portion of the sample substance 85 into the cavity 105. At the completion of the introduction of the sample substance 85 into the sample cell 26, the master valve 90 closes the fill line 106 and once again opens the air line 98. Upon a complete rotation of the master valve 90, a microswitch 108 is closed which sends out a start autozero (A/Z) signal which starts the referencing mode of operation of the ciricuit 50.

Figure 3:
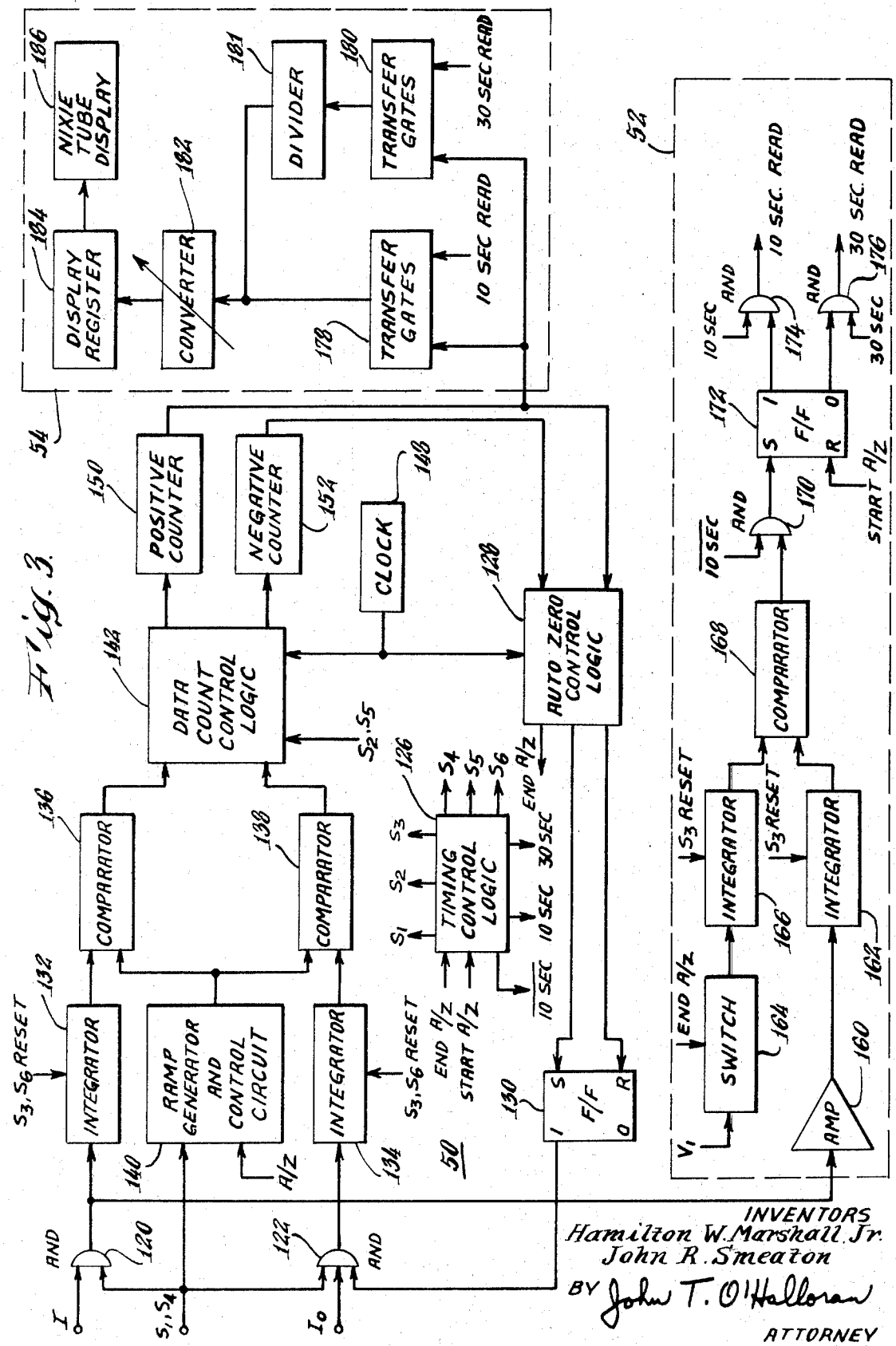
FIG. 3 is a block diagram of the electronic readout portion of the reaction detector of FIG. 1.

Referring to FIG. 3, the electronic readout portion of the reaction detector 10 includes the referencing and measuring ciricuit 50, the reading rate control circuit 52 and the digital display circuit 54. The referencing and measuring circuit 50 may, for example, be substantially similar to that described in Patent 3,579,105, entitled "Digital Readout System Having an Automatic Zero-Setting Circuit" and assigned to the same assignee as the present invention. The patent is herewith incorporated by reference into this application. However, a general description of the circuit 50 will be given so as to make this application complete in the descriptions of the functions of the various sub-systems in the detector 10.

The input of the circuit 50 includes a pair of AND gates 120 and 122, to which the sample (I) and reference ($I_o$) signals are applied respectively. There is also applied to each of the gates 120 and 122 timing signals $S_1$ and $S_4$ derived from a timing control logic circuit 126. The timing signal $S_1$ is generated during the referencing mode of operation of the circuit 50, whereas the timing signal $S_4$ is generated during the measuring mode of operation thereof. The AND gate 120 is therefore activated by the presence of a sample signal and either one of the timing signals, but the AND gate 122 requires an additional signal that is derived from a flip-flop 130. The flip-flop 130 activates the AND gate 122 when set, and de-activates this gate when reset. The flip-flop 130 is set and reset by an autozero control logic circuit 128. The flip-flop 130 under the control of the autozero control logic circuit 128 determines the amount of the reference signal ($I_o$) that is coupled through the input gate 122 into the referencing and measuring circuit 50. This effectively attenuates the reference signal $I_o$.

The outputs of the gates 120 and 122 are coupled respectively to the inputs of integrators 132 and 134. The integrators 132 and 134 integrate the input signals and retain the integrated value of the input signal until reset by timing signals $S_3$ or $S_6$ derived from the timing control logic circuit 126. The output signals of the integrators 132 and 134 are coupled respectively to analog comparators 136 and 138. Also coupled to the comparators 136 and 138 is a ramp signal derived from a ramp generator and control circuit 140. The ramp circuit 140 provides a ramp signal to which the integrated sample and reference signals are compared in the comparators 136 and 138. The analog comparators 136 and 138 are coupled to a data count control logic circuit 142, which controls when clock pulses derived from a clock pulse source 148 are applied to the advance terminals of a positive counter 150 and a negative counter 152. In the context in which the terms "positive" and "negative" are used in this specification, a reference signal $I_0$ that exhibits a greater absolute magnitude than a sample signal I produces a positive count in the counter 150; whereas a sample signal I that exhibits a greater absolute magnitude than a reference signal $I_0$ produces a negative count in the counter 152. The counts in the counters 150 and 152 are coupled to the autozero control logic circuit 128 to determine the difference between these counts. Hence the amount of attenuation required to make these signals equal is determined in the circuit 128. Therefore a reference level is established from which the rate of change of the sample signal I is measured.

The electronic readout portion of the reaction detector 10 also includes the reading rate control circuit 52. The reading rate control ciricuit 52 determines the time intervals at which the rate of reaction occurring in the sample substance is read. Such a decision depends on how fast the sample signal I reaches a threshold level. Consequently the output of the AND gate 120 is applied to an amplifier 160 in the reading rate control circuit 52. The amplifier 160 may, for example, exhibit no gain such that the input signal thereto equals the output signal thereof. The output of the amplifier is applied directly to an integrator 162 which is reset by a timing signal $S_3$. A signal source $V_1$ is coupled through a switch 164 to an integrator 166. The integrator 166 is also reset to zero by the timing signal $S_3$. The switch 164 may, for example, comprise a field effect transistor switch that is closed only upon the receipt of an end autozero (A/Z) signal derived from the autozero control logic circuit 128.

The integrator 166 establishes a threshold level at the end of the autozeroing of the reaction detector 10, and then holds the threshold value when the transistor switch 164 is opened. The output signals of the integrators 162 and 166 are applied to an analog comparator 168. The comparator 168 produces a high level output when the output signal of the integrator 162 equals the output signal derived from the integrator 166. If the high level output signal of the comparator 168 occurs before the end of 10 seconds after completion of autozeroing, an AND gate 170 is activated which ests a flip-flop 172. The AND gate 170 has applied thereto a continuous signal derived from the timing control logic circuit 126 which ceases at the tenth second timing signal (i.e., $\overline{10 \text{ SEC}}$). When the flip-flop 172 is set, an AND gate 174 is activated at the tenth second timing interval to produce a read signal for the detector 10. The flip-flop 172 is reset by a start autozero signal and, unless subsequently set, activates AND gate 176 at the thirtienth second timing interval. This produces a thirty-second read mode in the detector 10.

The numeric value stored in the counter 150 is transferred by transfer gates 178 and 180 to a converter 182 in the digital display circuits 54 at either the tenth or thirtieth second interval. The thirty second readout from the transfer gate 180 is divided by three in a divider 181 to place each readout on the same time base. The digital number from the counter 150 is converted by the variable converter 182 to a digital number that represents international units of enzyme concentration, as previously defined. The converter 182 couples the enzyme concentration number to a display register 184. The register 184 in turn is coupled to a Nixie tube display circuit 186 wherein the concentration of enzymes in the sample substance undergoing the reaction is displayed digitally for an operator to read.

In describing the operation of the electronic readout circuit 50 of FIG. 3, reference will be made to FIGS. 6 and 7, which graphically display how the electronic readout circuit 50 performs during the referencing and measuring modes of operation respectively. When the sample substance has been introduced into the sample cell 26 (FIG. 2) the microswitch 108 produces a start autozero signal (i.e., START A/Z). Such a signal starts the timing control logic circuit 126 to initiate the referencing mode of operation of the circuit 50. The AND gates 120 and 122, as well as the ramp circuit 140, are activated by the $S_1$ timing signal derived from the timing control circuit 126. The output signals of the ramp circuit 140, as well as the integrated reference $I_0$ and sample I signals are shown in FIG. 6. It is to be noted that the ramp signal $I_R$ exhibits a greater absolute magnitude than either the reference $I_0$ or sample I signals. After a predetermined integrating time, as determined by the timing signal $S_1$, the AND gates 120 and 122 are disabled and the ramp signal $I_R$ is caused to decay linearly, as shown by the linear decay curve 190 in FIG. 6. The integrators 132 and 134 hold the sample (I) and reference ($I_0$) signals substantially constant. When the decaying ramp signal 190 decays to the absolute magnitude of the reference signal $I_0$, the comparator 138 signals this equality and the data count control logic circuit 142 causes the positive counter 150 to count clock pulses generated by the clock pulse generator 148. It is to be noted that the counters 150 and 152 may for example be fractional counters producing a count only upon a multiple number of clock pulses such as 50, 100, etc. The positive counter is therefore initiated at the point 192 in FIG. 6 and the count continues until the decaying ramp signal $I_R$ equals the sample signal I at the point 194. The count pulses, as shown in FIG. 6, stop at this point. The integrators 132 and 134 are reset by the timing signal 53.

The autozero control logic circuit 128 detects the difference in count between the positive counter 150 and the negative counter 152. Of course in the example illustrated, the count in the negative counter 152 is zero. The count in the counter 150 is a measure of the difference between the reference ($I_0$) and sample (I) signals. The autozero control logic circuit 128 determines from this difference count or signal, the times when the flip-flop 130 should be set and reset to chop the input reference signal $I_0$. The gate 122 is pulsed on and off and the pulse width of the pulses determines the amount of reference signal $I_0$ that passes through the gate 122. The autozero control logic circuit 128 therefore uses the count to narrow the enabling pulses applied to the AND gate 122 to attenuate the reference signal $I_0$ to the signal level of the sample signal I. When the autozero logic circuit 128 accomplishes this determination, an end autozero signal (END A/Z) is produced which resets the counters 150 and 152 and initiates the measuring mode of operation of the circuit 50.

The end autozero signal (END A/Z) also initiates the establishing of the threshold 78 (FIG. 4) in the reading rate control circuit 52. The end autozero signal closes the switch 164 and permits the integrator 166 to integrate the $V_1$ source signal up to the predetermined threshold level 78. The switch 164 is then opened and the integrator 166 holds the threshold value while the integrator 162 is permitted to integrate the signal signal I while the reaction is occurring. When the output of the integrator 162 equals that of the integrator 166, then the comparator 168 produces an output signal that enables the AND gate 170. If the ten second timing interval signal, after autozeroing, has not been generated by the timing control circuit 126, then the flip-flop 172 is set. A fast reaction, such as that shown by the curve 72 in FIG. 4, is a reaction that sets the flip-flop 172. The AND gate 174 is therefore activated at the tenth second interval to cause a ten-second readout to occur during this measuring mode of operation of the circuit 50.

The measuring mode of operation of the circuit 50 is shown in FIG. 7. The reference signal $I_0$ is kept attenuated to the level of the sample signal $I$ by the memory contained in the autozero control logic circuit 128. Thus this level of the reference signal $I_0$ is a reference level from which the rate of divergence of the sample signal $I$ may be measured. The sample signal $I$ decreases because the continuing reaction causes a color change in the sample substance and hence a change in absorbance. As shown in FIG. 7, the timing signal $S_4$ causes the ramp circuit 140 to generate the ramp signal $I_R$ and the integrators to integrate the reference $I_0$ and the sample $I$ signals. It is to be noted that the time scales of FIGS. 6 and 7 are not exact but merely illustrative. The order of magnitude in FIG. 6 is milliseconds whereas it is seconds in FIG. 7. Similarly the integrating period in each figure is actually much longer than the corresponding count and reset periods therein.

In the example selected (i.e., the reaction denoted by curve 72 in FIG. 4) the period of integration is for substantially 10 seconds and then the signal $S_4$ ceases. The integrators maintain the sample $I$ and reference $I_0$ signals substantially constant. However, the ramp signal $I_R$ is caused to decay exponentially. This may be done for example by charging a capacitor in the ramp circuit 140 and then discharging the capacitor through a suitable resistor. When the exponentially decaying ramp signal 196 in FIG. 7 equals the reference signal $I_0$ at the point 198, the counter 150 is turned on to count. When the ramp signal decays to the point where it is equal to the sample signal $I$, at the point 200, the counter 150 is turned off. The count in counter 150 measures the difference between the reference $I_0$ and sample $I$ signals. At the time $S_6$, the integrators are reset and a new sample may be tested.

Allowing the ramp signal to decay exponentially permits the absorbance $$\left(\text{i.e., } \log_{10} \frac{I_o}{I}\right)$$

to be measured directly by obtaining the difference in amplitude between the reference signal $I_0$ and the sample signal $I$. Making the reference signal $I_0$ initially equal to the sample signal $I$ permits the rate of change in absorbance (i.e., $\Delta A/\Delta t$) to be measured at the tenth second interval.

It is to be noted that an operator of the detector 10 need not make any calculations to determine the rate of change in absorbance. Thus samples may be measured in times measured by seconds, rather than by minutes, as was heretofore the typical measurement time. Thus hundreds of samples may be measured rapidly by the detector 10.

It is also to be noted that the detector 10 may be operated in a repeat mode wherein autozeroing is initiated immediately after the timing period $S_6$. In such a situation, the reference signal $I_0$ is attenuated to the new level of the sample signal $I$ to create a new zero reference level. The second measurement is then made. Such a repeat-mode permits critical measurements to be checked immediately.

The reading rate control is also a significant advance over the prior art in that heretofore it was not apparent when a reaction was going too fast to make accurate measurements. This was because the rate of change of absorbance had to be calculated from a recording chart when the reaction was over. In the detector 10, the reading rate is automatically changed to track the reaction accurately.

Referring back to FIG. 3, the rate of change in absorbance of the reaction is stored as a digital number in the counter 150 and is automatically transformed into international units denoting the concentration of LDH enzymes in the sample. The resulting decimal number is then displayed on Nixie tubes. The transfer gate 178 causes the digital number to be transferred through the converter 182 to the display register 184. The transformation into international units occurs in the converter 182. The operator of the detector 10 adjusts the converter 182 initially to insert the correct conversion factor, as is now described.

The rate readout from the detector 10 is in terms of $\Delta A/10$ sec. whether the reading interval selected is 10 or 30 seconds. When conversion to enzyme concentration units is desired the conversion factor is calculated to relate to the 10 second base.

Factor derivation

An International Unit (IU) is defined as the conversion of 1 micromole of substrate per minute under defined conditions. The method described uses 0.2 milliliter (ml.) of serum in a final volume of 2.04 ml. at 30° C. and pH 7.4.

The absorbance a 1 centimeter path length of a 1 micromole/ml. solution of $NADH+H^+$ at 340 nanometers is 6.22.

The oxidation of 1 micromole of $NADH+H^+$ in the 2.04 ml. reaction mixture corresponds to an absorbance change of 6.22/2.04.

Then $$\Delta A/10 \text{ sec.} \times \frac{2.04}{6.22} = \text{micromoles of } NADH+H^+$$

oxidized by 0.2 ml. of serum in 10 sec.

$$\therefore \Delta/10 \text{ sec.} \times \frac{2.04}{6.22} \times \frac{6}{0.2} = \text{micromoles } NADH+H^+$$

oxidized per minute by 1 ml. of serum.

This corresponds to IU/ml. and multiplication by 1000 converts the answer to the more convenient mIU/ml.

The conversion factor is therefore $$\frac{\Delta A/10 \text{ sec.} \times 6 \times 2.04}{6.22 \times .2} \times 1000$$

or $\Delta A/10$ sec $\times 9839$. The international units are stored in the display register 182 and light up the Nixie tube display 186.

Thus in a reaction detector embodying the invention, the reaction rates of zero order kinetic reactions of enzyme-catalyzed types are measured automatically and the measurement is automatically converted to be read out as a number signifying the concentration of enzymes in the sample substance.

We claim:

1. A rate of reaction detector for measuring the rate of change of absorbance in a sample substance undergoing a reaction and including a source of light for projecting through said sample substance and through a reference to provide first and second light signals respectively, comprising in combination:

photoelectric means for converting said first and second light signals into first and second electronic signals respectively, means for first measuring the difference between said first and second electronic signals to derive a difference signal, means for utilizing said difference signal to attenuate said first electronic signal to make said first and second electronic signals substantially equal, means for maintaining said first electronic signal substantially constant to establish a zero reference level, means for detecting the initial speed of said reaction, and means for measuring the difference between said first and second electronic signals at a time later than said first measurement dependent on said initial speed of said reaction to provide directly from the second measurement the rate of change of absorbance during said reaction.

2. The combination in accordance with claim 1 wherein said means for detecting the initial speed of said reaction includes
  means for establishing a predetermined threshold value and
  means for determining if said second electronic signal exceeds said predetermined threshold value a predetermined time after the start of said reaction.

3. The combination in accordance with claim 2 wherein said means for measuring the difference between said first and second signals includes
  a generator for providing a reference signal that increases until said second measurement of said difference between said first and second electronic signals and
  means coupled to said generator to provide an exponential decay of said reference signal until the equality of said reference signal to said first and second electronic signals are determined.

4. The combination in accordance with claim 3 wherein said equality of said reference signal with said first and second electronic signals is determined by
  a first comparator for comparing said exponentially decaying reference signal with said first electronic signal and
  a second comparator for comparing said exponentially decaying reference signal with said second electronic signal.

5. The combination in accordance with claim 4 that further includes a counter coupled to said first and second comparators to count the time interval between the times at which said comparators signal equality to said first and second electronic signals respectively.

6. The combination in accordance with claim 5 that further includes
  means for automatically converting said count in said counter into international units of enzyme concentration, and
  means for displaying said concentration number in digital form.

7. The combination in cacordance with claim 5 that further includes means for repeating said first and second measurements to establish a shifting reference level to provide a plurality of readings of said reaction.

References Cited
UNITED STATES PATENTS

| | | | |
|---|---|---|---|
| 3,490,875 | 1/1970 | Harmon et al. | 195—127 X |
| 3,542,515 | 11/1970 | Scott | 195—127 X |

ALVIN E. TANENHOLTZ, Primary Examiner
R. J. WARDEN, Assistant Examiner

U.S. Cl. X.R.
23—253 R; 195—103.5 R; 356—205